Sept. 20, 1960  E. F. ELMAN ET AL  2,953,031
GEARING
Filed Nov. 20, 1959  2 Sheets-Sheet 1
FIG.1
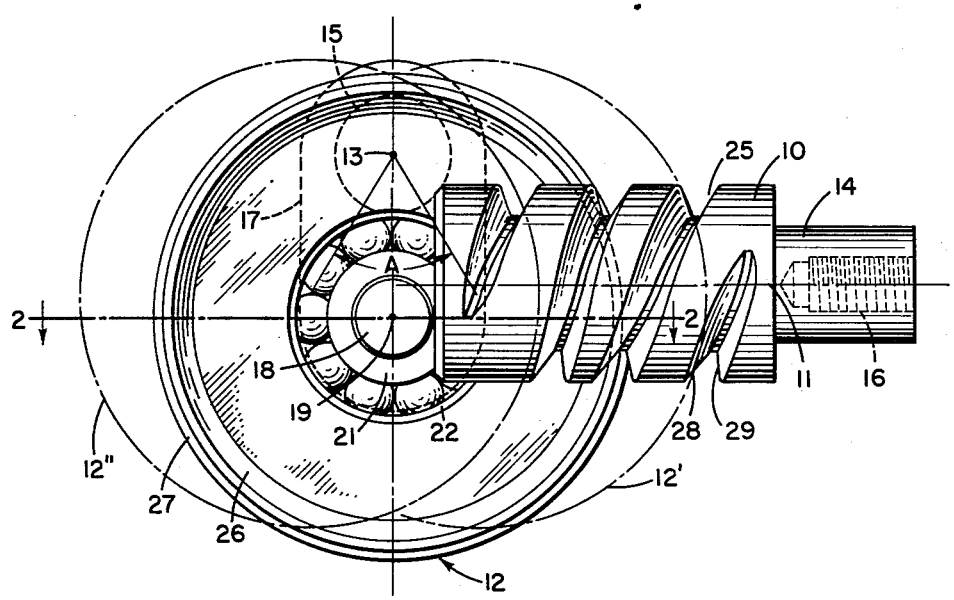
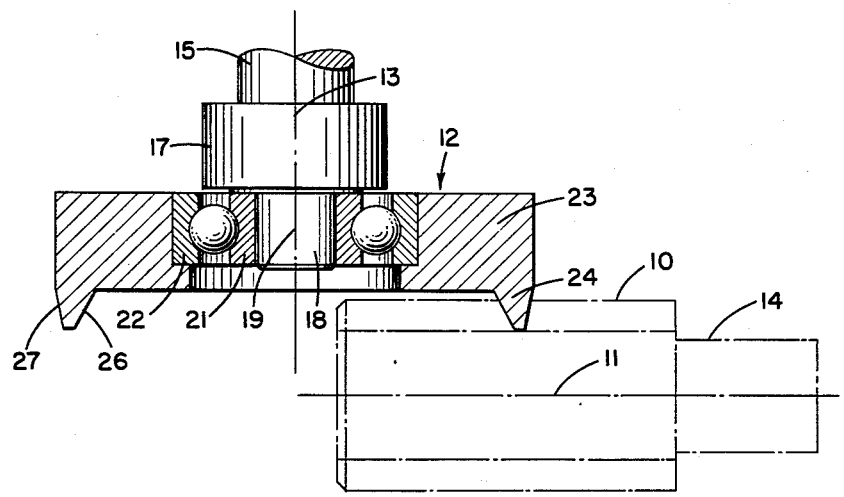
FIG.2
INVENTORS
EDWARD F. ELMAN
CHARLES B. KING
BY
Richard W. Treverton
ATTORNEY Sept. 20, 1960     E. F. ELMAN ET AL     2,953,031
GEARING Filed Nov. 20, 1959     2 Sheets-Sheet 2

United States Patent Office 2,953,031
Patented Sept. 20, 1960

2,953,031
GEARING

Edward F. Elman and Charles B. King, Rochester, N.Y., assignors to The Gleason Works, Rochester, N.Y., a corporation of New York Filed Nov. 20, 1959, Ser. No. 854,362

14 Claims. (Cl. 74—54)

The present invention relates to gearing of the kind comprising a worm-type pinion and a gear meshing therewith, with their axes of rotation in offset and angular relation to each other.

An object of the invention is gearing of this kind adapted to operate with a varying velocity ratio and yet having a tooth bearing or contact area sufficiently large for the transmission of substantial loads without undue wear. A further object is such gearing wherein the tooth surfaces of the gear member may be produced by form cutting while those of the pinion may be generated with a milling cutter or annular grinding wheel. As to our preferred embodiment of the invention a further objective is gearing of the aforementioned kind wherein the contact between the pinion and gear teeth is primarily rolling contact.

In the accompanying drawings:

Fig. 1 is an elevation of one preferred embodiment of the gearing in a plane perpendicular to the axis of the gear member;

Fig. 2 is a sectional view of the gear member in plane 2—2 of Fig. 1, with the pinion member appearing in elevation in broken lines;

The gearing illustrated is of general application in situations where the angular motion of the gear is limited to a fraction of one turn. One application is in the steering gear of automobiles and other vehicles, but it is to be understood that our invention is neither specifically directed to nor limited to this particular application.

Figure 3:
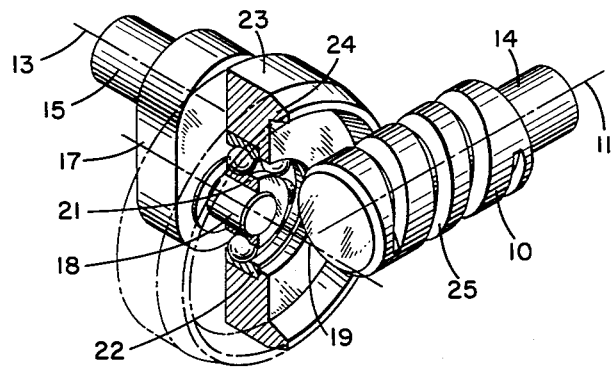
Fig. 3 is an axonometric view of the gearing of Figs. 1 and 2 with a part of the gear member broken away.

Referring to Figs. 1 to 3, the gearing comprises a worm-type pinion 10 adapted for rotation about axis 11, and a gear 12 adapted for rotation about an axis 13 which is in offset and angular relation to axis 11. In the illustrated embodiment the axes 11 and 13 are at right angles, as best shown in Fig. 2, but other angular relations may be chosen. Preferably the gear and pinion are mounted for rotation about their respective axes in a gear case, not shown; for example the shank 14 of the pinion and shaft portion 15 of the gear may be journaled in suitable bearings in such a case. The pinion may be rotated by a suitable shaft attached to it in any suitable manner, such as by connection to a screw-threaded bore 16 in the shank. For example in the case of an automobile steering gear the steering post may be so connected to the pinion.

The gear illustrated in Figs. 1 to 3 has a rigid body comprising shaft 15, a crank arm 17 and a crank pin 18 whose axis 19 is parallel to axis 13. Fast on pin 18 is the inner race 21 of a ball-bearing whose outer race 22 is fast on an annular member 23 having a single circular tooth 24 engaged in a tooth slot 25 of the pinion. The tooth 24 has concentric concave and convex surfaces, 26 and 27, which are conical surfaces whose cone axis is coincident with axis 19. These surfaces are also concentric with ball-bearing races 21, 22, enabling the tooth 24 to roll along the pinion tooth slot 25 with a minimum of friction when the pinion is rotated.

The opposite sides 28 and 29 of the pinion tooth are generated to be conjugate in shape to respective gear tooth sides 26 and 27. This generation may be carried out on a cutting or grinding machine generally similar to those ordinarily employed for generating spiral bevel and hypoid pinions. In such generation a face mill cutter, rotating on an axis corresponding to axis 19, and whose cutting edges then sweep or describe surfaces of revolution corresponding to surfaces 26 and 27, is caused to swing around an axis corresponding to axis 13 while the pinion blank is rotated about its axis 11. During such generation the ratio of the rotation about axis 11 to the rotation about the axis corresponding to 13 may be varied so that the pinion being produced will be shaped so as to drive gear 12 at a corresponding varying velocity.

Figure 5:
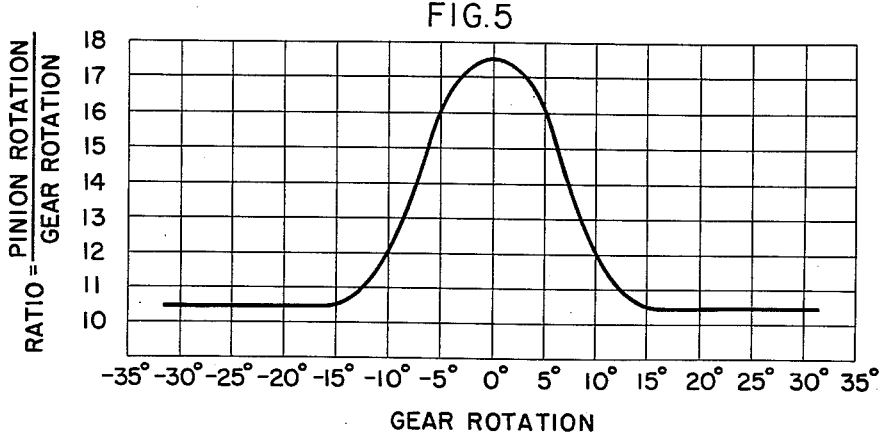

One example of such velocity variation is illustrated in Fig. 5 where in the on-center or 0° position of the gearing, i.e. the position shown in full lines in Fig. 1, the ratio of pinion rotation to gear rotation is about 17.5 to 1. As the gear is rotated to either side of this position the ratio decreases, so that when the gear 12 has been rotated approximately 15° in either direction from its 0° position, the ratio has become about 10.5 to 1 and remains constant at this value as the gear is moved on from such 15° position to the extreme or limit position in the same direction. The two limit positions are shown in broken lines at 12' and 12" in Fig. 1. In the particular embodiment shown, these limit positions occur when the gear has swung somewhat over 30° from its on-center position, so that the total angle of movement of the gear, designated angle A in Fig. 1, is greater than 60°. We are aware of the fact that similar ratio variation has been proposed heretofore in automobile steering gear, and we make no claim of novelty for this feature except in connection with our novel form of gearing which is particularly favorable for the attainment of such ratio variation. By reference to Fig. 1 it will be noted that in the formation of the tooth slot 25 of the particular pinion 10 that is illustrated, this slot has been made substantially longer than is necessary to provide for motion of the gear 12 through the angle A between intended limit tpositions 12' and 12".

Figure 4:
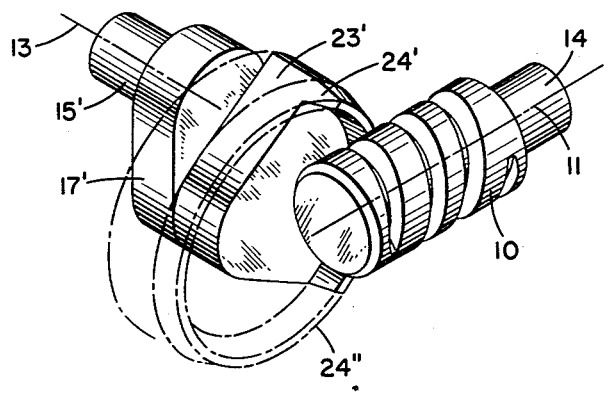
Fig. 4 is an axonometric view of another preferred embodiment of the gearing; and, Fig. 5 is a graph showing the ratio of pinion rotation to gear rotation in various angular positions of the gearing shown in the preceding views.

In cases where friction due to lengthwise sliding between the pinion and gear teeth can be tolerated, the parts 15, 17 and 23 of the gear may be rigidly connected or integral. In this event only a part of the complete circular gear tooth 24 can have contact with the pinion, and of course the unused portion may be omitted entirely if desired. Such an arrangement is shown in Fig. 4 where the shaft, crank arm and tooth bearing parts 15', 17' and 23' of the gear are integral, and the tooth 24' is in the form of an arc of a circle. The omitted portion of the circular tooth is shown by broken lines at 24".

Having now described preferred embodiments of our new gearing and the ways in which the gear tooth surfaces may be produced, we claim as our invention:

1. Gearing comprising a pinion and a one-tooth gear segment whose axes of rotation are in offset and angular relation to each other, the pinion having a tooth slot for receiving the gear tooth and adapted to contact it on both sides, the sides of the gear tooth respectively being convex and concave coaxial surfaces of revolution, and the sides of said slot being conjugate to said tooth sides and of such lead that the angular velocity ratio between the pinion and gear is different in different angular positions of them.

2. Gearing according to claim 1 in which the axis of said surfaces of revolution is parallel to the axis of rotation of the gear.

3. Gearing according to claim 1 in which said axes of the pinion and gear segment are at right angles.

4. Gearing according to claim 1 in which said tooth sides are conical surfaces.

5. Gearing according to claim 1 in which said tooth is in the form of a segment of a circle.

6. Gearing according to claim 1 in which said tooth is in the form of a complete circle.

7. Gearing according to claim 6 in which the gear segment comprises a body on which the tooth is rotatable about the axis of said surfaces of revolution.

8. Gearing according to claim 1 in which the ratio of pinion rotation to gear rotation decreases as the rotation proceeds in either direction from the central position of the gearing.

9. Gearing according to claim 8 in which the ratio of pinion rotation to gear rotation is smallest and constant in the terminal portion of the rotation in either direction.

10. Gearing according to claim 1 in which the ratio of pinion rotation to gear rotation changes as the rotation proceeds in either direction from the central position of the gearing.

11. Gearing according to claim 10 in which the rate of change of ratio is substantially the same in both of said directions.

12. Gearing according to claim 10 in which the ratio of pinion rotation to gear rotation is constant in the terminal portion of the rotation in either direction.

13. Gearing comprising a pinion and a one-tooth gear segment whose axes of rotation are in offset and angular relation to each other, the gear segment including a body and a member rotatable on the body about an axis parallel to the gear axis, said member having thereon a single gear tooth in the form of a circle, the sides of said tooth respectively being internal and external coaxial surfaces of revolution whose axis is coincident with that about which said member is rotatable on said body, and the pinion having a tooth slot for receiving said tooth and adapted to contact it on both sides.

14. Gearing according to claim 13 in which the axes of the pinion and gear segment are at right angles.

References Cited in the file of this patent

UNITED STATES PATENTS

| | | |
|---|---|---|
| 1,545,354 | Ross | July 7, 1925 |
| 1,906,720 | Robbins | May 2, 1933 |
| 2,534,536 | Staude | Dec. 19, 1950 |